United States Patent Office 3,523,976
Patented Aug. 11, 1970

---

3,523,976
METHOD OF PREPARING CUMENE HYDROPEROXIDE
Cesare Reni and Luigi Lugo, Milan, Italy, assignors to Società Italiana Resine S.p.A., Milan, Italy
No Drawing. Filed Oct. 16, 1967, Ser. No. 675,304
Claims priority, application Italy, Oct. 26, 1966, 2,929/66
Int. Cl. C07c 73/08
U.S. Cl. 260—610                                  4 Claims

ABSTRACT OF THE DISCLOSURE

In the process of oxidizing cumene to cumene hydroperoxide by means of molecular oxygen (ordinarily air) in an homogeneous reaction medium at elevated temperature in the presence of the sodium salt of cumene hydroperoxide, the oxidation is carried out in the addition presence of diacetone alcohol. Amounts diacetone alcohol exceeding 0.3 wt. percent (preferably exceeding 1 wt. percent), referred to the reactant cumene, have been found to effectively inhibit by-product formation in the conditions of the process.

---

The invention concerns an improved method of preparing cumene hydroperoxide.

Oxidation of cume to its corresponding hydroperoxides CHP is the first step of a known synthesis of phenol which includes the said oxidation of cumene followed by acid hydrolysis of hydroperoxide forming phenol and acetone, finally the separation of the ketone and phenol products from each other and from by-products of the reaction.

Oxidation of cumene is mostly carried out in liquid phase, in a homogeneous medium or in an aqueous emulsion by means of molecular oxygen, preferably at a superatmospheric pressure of a few atmospheres and in the presence of small quantities of additives such as caustic soda, sodium carbonate, calcium carbonate and the like.

In order to avoid unacceptably high proportions of by-products a fraction only of the cumene batch or feed is converted. The conversion percentage does not generally exceed about 25–30% by weight.

It was further endeavoured to decrease the formation of by-products by removing impurities from the starting cumene by an adequate purification, such as by hydrogenation or washing with alkali or acids. For it is known that the presence of foreign substances in the reaction mixture promotes the formation of by-products.

However, notwithstanding the part-conversion, only, of cumene and its preliminary purification, the resulting hydroperoxide contains as an average approximately 12 to 18% of a mixture of by-products essentially comprising dimethylphenylcarbinol and acetophenone. Our prior Italian Pat. No. 633,480 discloses a method of oxidizing cumene in the liquid (preferably homogeneous) phase in the presence of small amounts, of the sodium salt of CHP.

The use of this accelerator affords high reaction speeds and very high conversions of cumene to CHP, the proportion of by-products being to reduced values even below 6% with respect to the raw CHP.

It has now been found that the cumene-to-CHP conversion yield can be further improved by adding, to the cumene to be oxidized, diacetone alcohol in addition to the sodium salt of CHP. The effect of diacetone alcohol on the progress of oxidation of cumene is all the more surprising, as it had always been assumed that cumene must be freed from any impurities contained therein if a satisfactory progress of its oxidation is wanted.

The main object of the invention is therefore to provide a method in which cumene is oxidized to CHP in the presence of diacetone alcohol, whereby the formation of by-products, such as dimethylphenylcarbinol and acetophenone is extremely reduced.

Though the mechanism of action of the added diaetone alcohol is not known, it was ascertained that this substance very strongly inhibits formation of by-products.

Actually, formation of the hydroperoxide is slowed down too, though by an uncomparatively smaller extent than the formation of by-products.

This method is all the more surprising, as it is known that the dimethylphenylcarbinol/CHP ratio in the reaction mixture becomes higher or increase of the reaction period.

It will be obvious from the above that oxidation of cumene to CHP in the presence of diacetone alcohol makes the method more attractive from an economic standpoint through its improved conversion yields and because the very small amount of by-products makes substantially less expensive the recovery of the hydrolysis products (phenol and acetone).

In order to fulfil the objects of the invention the oxidation reaction of cumene to CHP is carried out at elevated temperature in a homogeneous reaction medium by means of molecular oxygen or oxygen-bearing gases such as air, in the presence of diacetone alcohol and sodium salt of CHP.

Operation can be carried out at atmospheric pressure or, preferably, at a superatmospheric pressure of a few atmospheres and at temperatures from 90° to 120° C.

In the preferred embodiment of the invention the sodium salt of cumene hydroperoxide is employed in a proportion of 0.05–0.5% by weight with respect to the cumene to be oxidized.

The amount of diacetone alcohol added to the reaction medium advantageously exceeds 0.3% by weight as referred to the reactant cumene, and preferably exceeds 1% by weight; no critical upper limit appears to exist.

Where reaction is carried out discontinuously, the diacetone alcohol is added at the beginning of the reaction and its evaporation losses are advantageously compensated by corresponding amounts added during the course of the reaction. Where the oxidation reaction is carried out continuously, the diacetone alcohol is supplied to the reaction mixture by the abovementioned proportions either mixed with cumene feed or as an independent feed.

The following examples further illustrate the invention.

EXAMPLE 1

To a column of 300 mm. diameter and 3,000 mm. height, of stainless steel AISI 304, equipped with a reflux cooler, automatic expansion valve at the outlet of the coolant and automatic analyser for the oxygen content in the exhausted air, there are charged 99 liters of cumene containing about 0.1% by weight sodium salt of CHP and 450 ml. (0.48 wt. percent on cumene) diacetone alcohol. Heating is effected by means of an external jacket at 95° C. Upon reaching this temperature blowing-in of air is started up to a gauge pressure at the outlet of 5 atmospheres. At this stage cumene feed containing 0.1% by weight of the sodium salt of CHP is started and continued at a rate of 80 liter/hr. together with 350 ml./hr. (0.46 wt. percent on cumene) diacetone alcohol.

Injection of air is adjusted so that the exhausted air contains 5 to 6% (by volume) residual oxygen.

Supply of cumene, diacetone alcohol and air is effected at the bottom region of the column, liquid being preferably injected at a slightly higher level than air.

The oxidized liquid is continuously discharged by means of a level adjuster and is washed with a little water and subsequently decanted in a continuous decanter. The result is a 24.2% by weight CHP in unreached cumene. The solution contains about 3.1% by weight dimethylphenylcarbinol and 1.2% acetophenone, referred to CHP.

EXAMPLE 2

By adopting the apparatus and mode of operation described in Example 1, approximately 98 liters cumene containing 0.1% by weight of the sodium salt of CHP are charged to the column together with 2.0 liters (2.2 wt. percent on cumene) diacetone alcohol.

On reaching a temperature of 95° C. the column is supplied with a 77 liters/hour feed of cumene containing 0.1% sodium salt of CHP together with a feed of 1.6 liters/hour diacetone alcohol, the air flow being adjusted as described in the first example.

After washing and decanting a 24.0% by weight cumene hydroperoxide solution is obtained, containing about 2.8% by weight dimethylphenylcarbinol and 0.8% acetophenone, referred to CHP.

EXAMPLE 3

By adopting the apparatus and mode of operation described in Example 1, approximately 95 liters cumene containing 0.1% by weight sodium salt of CHP are charged to the column toagether with 4.5 liters (5 wt. percent on cumene) diacetone alcohol.

On reaching a temperature of 95° C. the column is supplied with a 70 liter/hour feed of cumene containing 0.1% sodium salt of CHP together with a feed of 3.3 liters/hour diacetone alcohol, the air flow being adjusted as in Example 1.

After washing and decantnig a 24.8% by weight cumene hydroperoxide solution is obtained, containing about 2.1% dimethylphenylcarbinol and 0.6% acetophenone, referred to the hydroperoxide.

As will be apparent from the examples, the diacetone alcohol can be present in an amount within the range 0.3% to 5% by weight based on the cumene feed, and the pressure of operation can be within the range of from atmospheric pressure to 5 atmospheres.

What we claim is:

1. In the process for oxidizing cumene to cumene hydroperoxide by molecular oxygen in a homogeneous reaction medium in the presence of from 0.05 to about 5.0% by weight based on the cumene feed of the sodium salt of cumene hydroperoxide, the improvement which comprises:

supplying diacetone alcohol to said homogeneous reaction medium at a quantity exceeding 0.3% by weight based on the cumene feed; and maintaining the temperature of operation within the range 90 to 120° C., and the pressure of operation at least at atmospheric pressure.

2. The process of claim 1 wherein the amount of diacetone alcohol is greater than 1% by weight.

3. The process of claim 1 wherein said diacetone alcohol is present in an amount within the range 0.3% to 5% by weight based on the cumene feed.

4. The process of claim 1 wherein the pressure of operation is maintained within the range atmospheric to 5 atmospheres.

References Cited

UNITED STATES PATENTS

| | | | |
|---|---|---|---|
| 2,843,633 | 7/1958 | Natta | 260—610 |
| 3,171,860 | 3/1965 | Codignola. | |

BERNARD HELFIN, Primary Examiner

W. B. LONE, Assistant Examiner

U.S. Cl. X.R.

260—618, 592